Patented Sept. 7, 1954

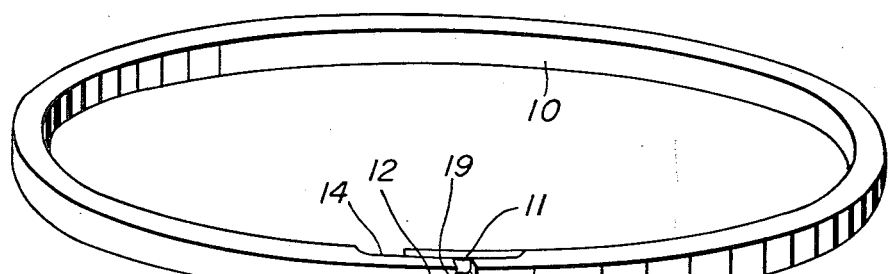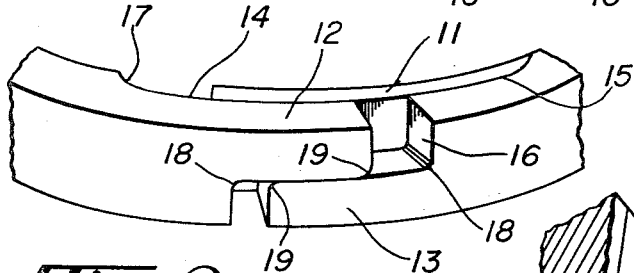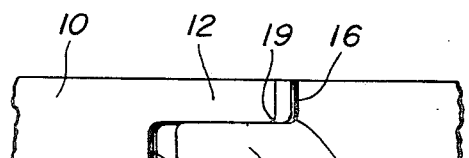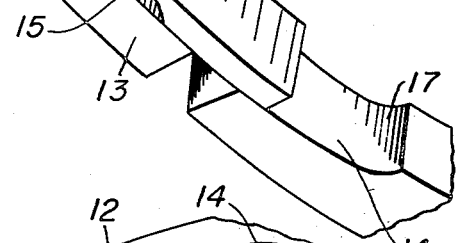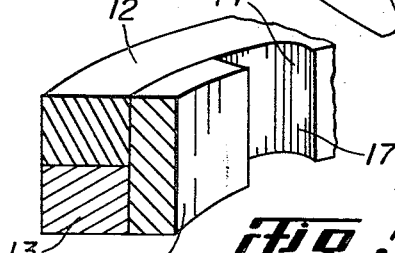

2,688,522

UNITED STATES PATENT OFFICE 2,688,522

PISTON RING

Richard W. Hoyt and John Howard Smith, Fort Worth, Tex., assignors to Double Seal Ring Company, Fort Worth, Tex., a corporation of Texas Application March 5, 1951, Serial No. 213,884

3 Claims. (Cl. 309—46)

This invention relates to new and useful improvements in piston rings.

One object of the invention is to provide an improved piston ring wherein the tongue or sealing member is disposed on the inner side or inner periphery, whereby the tongue may be made of material having a high tensile strength and the body of the ring of the usual cast iron or other material, with the result that the tongue will be stronger and since it does not contact the cylinder wall, it can be reduced in thickness to a degree that the recesses provided for the tongue do not weaken the body of the ring.

An important object of the invention is to provide a piston ring of the stepped joint and tongue type wherein only one material comes into contact with the cylinder wall.

A further object of the invention is to provide an improved piston ring so constructed that it may be installed with either its top side or its bottom side uppermost, without impairing its sealing efficiency with respect to both its inner and outer peripheries.

Another object of the invention is to provide an improved piston ring wherein the stepped ends of the ring may be made of unequal thicknesses; the step against which the tongue is brazed or welded being the lesser and being reinforced by said tongue, whereby the other step can be enlarged to increase its cross-sectional strength and also whereby the tongue is adequately supported against bending.

A still further object of the invention is to provide a piston ring wherein the sealing tongue which, while made of a stronger material than the remainder of the ring, is confined on the inner side of the ring and if it should break away or come loose, will not only not damage the cylinder wall, but will be confined in the ring groove so that no scoring or damage to the piston or liner will occur.

A further object of the invention is to provide an improved piston ring so arranged that it will seal against the passage of fluid from two different directions, thus making it more efficient for use in a piston of a double acting engine or machine, wherein only one piston ring is usually employed on the piston.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a perspective view of a piston ring constructed in accordance with the invention, Fig. 2 is an enlarged perspective view of the ring joint in its expanded position, Fig. 3 is an inner and under side view of the ring joint shown in Fig. 2.

Fig. 4 is an elevational view of the ring joint,

Fig. 5 is an enlarged, transverse, sectional view through the joint or seal,

Fig. 6 is a plan view of a slightly modified form of joint in its expanded position, and Fig. 7 is an underside view of the same.

In the drawing, the numeral 10 designates the annulus or body of a one-piece piston ring. Due to the structure herein set forth the body or all of the ring except its details and the tongue 11, may be made in the usual manner and of material best suited for the purpose, as for instance cast iron. However, the tongue 11, because of its location and arrangement may be made of steel or other hard metal. Metals for the tongue have been used which have a tensile strength up to 250,000 p. s. i.

In forming the ring, after the body 10 has been produced and cut, the ends or tenons 12 and 13, respectively, are formed so as to overlap, the tenon 12 overlapping and sliding upon the underlying tenon 13. The entire inner sides of the end portions of the ring are recessed or cut away from top to bottom of the ring to provide seats or sockets 14 and 15, respectively, the seat 14 in the end having the tenon 12, being longer than the seat 15 in the end from which the tenon 13 extends.

The tongue, which is struck on the same general longitudinal curvature as the ring body, is brazed, welded or otherwise secured in the seat 15 and along the inner side of the tenon 13 so as to project from the end of such tenon and have sliding engagement in the seat 14 of the tenon 12. The seat 15 is of such length that when the ends of tenons 12 and 13 abut, the inner vertical shoulders 16 at the inner ends of said tenons, or in other words, when the ring is fully contracted, the outer end of the tongue will not contact the inner end 17 of the seat 14, which end is transversely curved.

It is to be noted that the tongue 11 is not only firmly secured along the entire height of the body of the ring, inwardly of the tenon 13, but is also secured against the flat inner, vertical side of the tenon 13 as well. Further, the tongue extends beyond the outer end of the tenon 13 so as to lie flat and vertically against the inner side of the tongue 12. Since only the homogenous metal of the ring body is exposed on the outer periphery or face of the ring, any danger of scoring the cylinder wall, due to abrasion by the protrusion or contact of a metal member capable of damaging the cylinder wall is eliminated. Further, due to the fact that all of the metal of the ring which is contacted with the cylinder wall is of substantially uniform strength and consistency, better ring seating is had. It is pointed out that it is practically impossible to obtain two different metals which have exactly the same wearing qualities. Further, it is stressed that since the metal tongue does not come into contact with the cylinder wall, it not only can be of any very high tensile strength material, but it may be reduced in thickness to such a point that the recesses provided for the tongue do not weaken the body of the step cut. Although the tongue is relatively thin, sufficient strength is provided due to the width of said tongue being substantially equal to the height or width of the body.

As before pointed out, the ring may be installed with either its top or bottom uppermost, due to the tongue arrangement at the inner side. This tongue disposition, together with the step cut of the ring ends, permits the installation of the ring with either its top or bottom uppermost, since there will be no difference in its sealing efficiency. Further, the tongue 11, because of its structure and its location on the inner side of the ring, as well as its width, may be made somewhat shorter than the tongues of previous rings. Further, it would be possible, because of the tongue structure, to make the tenon 13, which is braced by the tongue, of less vertical thickness, whereby the tenon 12 could be made thicker to increase its cross-sectional strength. If the tongue should break off or become loose, no harm will occur because the detached or loose part will be retained in the groove. The tongue being of stronger metal will have greater endurance and more even wear, and fatigue, due to flexing, will be greatly reduced. It will be noted that the free projecting end portion of the tongue bridges the gaps between the overlapping tenons and that the socket 14 in the free end of the ring body is of such length that when the ends of tenons abut the shoulders 16, the free end of said tongue will still be spaced from the end 17 of the socket, as before pointed out.

Due to its structure or formation, this ring is simpler and less expensive to manufacture than rings approaching its functions. The ring is also self-locking, since the tenon 13 is restrained from moving outwardly because of the engagement between the upper portion of the tongue 11 and the tenon 12. It is again stressed that the tongue being substantial and having appreciable width as well as being made of high tensile strength material, is relatively rigid and not readily yieldable.

In Figs. 1 to 5, inclusive, the ring is shown with fillets 18 at the intersections of the shoulders 16 and the tenons. The corresponding ends of the tenons are rounded off as shown at 19 to conform to the curvature of the fillets. This avoids sharp or angular joints at these points and strengthens the structure against shearing at these points. In Figs. 6 and 7, right angular surfaces are employed and may be used if desired.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. An integral piston ring including, a split resilient ring body having inner and outer circumferential faces and provided with tenons overlapping one above the other, arcuate sockets in the inner face of the body extending from the top to the bottom of said body along the tenons and inwardly from the inner ends of said tenons, the top and bottom surfaces of said body and tenons being continuous and flat and substantially parallel, and an arcuate tongue mounted in the sockets and extending from the top to the bottom surfaces of the body and tenons with its longitudinal surfaces flush with the top, bottom and inner surfaces of said body and tenons whereby the ring has constant internal and external diameters and presents a uniform top surface to minimize fluttering of the ring, one end of the tongue being bonded in one of the sockets and completely filling the same and in effect being integral with said body, the other end of said tongue being slidable in the other socket.

2. An integral piston ring as set forth in claim 1 wherein the tongue is completely bonded to the wall of one of the sockets throughout the length of said socket.

3. An integral piston ring as set forth in claim 1 including, radial fillets at the intersections of the tenons and of the ring body, the outer end of said tenons being rounded radially to conform to the fillets.

References Cited in the file of this patent

UNITED STATES PATENTS

| Number | Name | Date |
| --- | --- | --- |
| 654,211 | Wilson | July 24, 1900 |
| 1,000,135 | West | Aug. 8, 1911 |
| 1,181,618 | Smith | May 2, 1916 |
| 1,225,101 | Ballmer | May 8, 1917 |
| 1,393,211 | Frykman | Oct. 11, 1921 |
| 1,975,344 | Baker | Oct. 2, 1934 |

FOREIGN PATENTS

| Number | Country | Date |
| --- | --- | --- |
| 1,635 | Great Britain | Jan. 22, 1904 |
| 11,057 | Great Britain | May 13, 1904 |